US008153040B2

(12) United States Patent
Schuermann et al.

(10) Patent No.: US 8,153,040 B2
(45) Date of Patent: Apr. 10, 2012

(54) METHOD AND APPARATUS FOR PRESSING PARTICLE MATS

(75) Inventors: Klaus Schuermann, Juechen (DE); Lothar Sebastian, Duisburg (DE)

(73) Assignee: Siempelkamp Maschinen-Und Anlagenbau GmbH & Co. KG, Krefeld (DE)

( * ) Notice: Subject to any disclaimer, the term of this patent is extended or adjusted under 35 U.S.C. 154(b) by 287 days.

(21) Appl. No.: 12/519,364

(22) PCT Filed: Dec. 11, 2007

(86) PCT No.: PCT/EP2007/010790

§ 371 (c)(1), (2), (4) Date: Jul. 6, 2009

(87) PCT Pub. No.: WO2008/074417

PCT Pub. Date: Jun. 26, 2008

(65) Prior Publication Data

US 2010/0090359 A1 Apr. 15, 2010

(30) Foreign Application Priority Data

Dec. 16, 2006 (DE) ........................ 10 2006 059 564

(51) Int. Cl.
*B29C 43/22* (2006.01)

(52) U.S. Cl. ...... 264/40.4; 264/40.5; 264/109; 425/148; 425/150; 425/371

(58) Field of Classification Search ........................ None
See application file for complete search history.

(56) References Cited

U.S. PATENT DOCUMENTS

| | | | | |
|---|---|---|---|---|
| 4,038,531 | A | 7/1977 | Loe | 70/112 |
| 5,404,810 | A | 4/1995 | Bielfeldt | 100/38 |
| 5,454,304 | A * | 10/1995 | Bielfeldt | 100/43 |
| 6,098,532 | A | 8/2000 | Sebastian | 100/41 |
| 6,142,068 | A | 11/2000 | Sebastian | 100/154 |
| 6,829,987 | B2 * | 12/2004 | Gawlitta et al. | 100/311 |
| 2003/0213380 | A1 | 11/2003 | Sebastian | 100/151 |

FOREIGN PATENT DOCUMENTS

| | | |
|---|---|---|
| DE | 2444470 | 4/1976 |
| DE | 3914112 | 10/1990 |

* cited by examiner

*Primary Examiner* — Mary F Theisen
(74) *Attorney, Agent, or Firm* — Andrew Wilford

(57) ABSTRACT

The invention relates to a method of pressing pressing-material mats during the production of wood-material panels in a continuous press, wherein the continuous press has upper and lower heating plates, upper and lower entry plates, which project on the entry side and form an entry mouth, and, in the upper and lower parts of the press, endlessly circulating steel pressing belts which, with the interposition of rolling bars, are supported on the entry plates and the heating plates, wherein the height $h_0$ of the entry gap and, possibly, the entry contour of the entry mouth are set, and wherein a pressing-material mat, which is produced, and possibly pretreated, in a spreading station arranged upstream of the press, is introduced into the continuous press and pressed therein. This method is characterized in that the entry-gap height is checked, set and/or regulated in dependence on the density and/or the weight per unit area of the pressing-material mat.

12 Claims, 3 Drawing Sheets

METHOD AND APPARATUS FOR PRESSING PARTICLE MATS

CROSS REFERENCE TO RELATED APPLICATIONS

This application is the US national stage of PCT application PCT/EP2007/010790, filed 11 Dec. 2007, published 26 Jun. 2008 as WO2008/074417, and claiming the priority of German patent application 102006059564.5 itself filed 16 Dec. 2006, whose entire disclosures are herewith incorporated by reference.

FIELD OF THE INVENTION

The invention relates to a method of pressing particle mats for making engineered wood panels in a continuous press.

BACKGROUND OF THE INVENTION

A standard continuous press comprises upper and lower heated plates, upper and lower intake plates projecting on the intake side and designed to form an intake mouth with an intake gap, and steel press belts continuously circulating in the upper press part and lower press part, the press belts being supported on the intake plates and heated plates on an array of roller rods, wherein the intake gap height of the intake gap, and optionally the intake shape of the intake plates, are set, and wherein a particle mat, which is produced in a deposition station provided upstream of the press is optionally pretreated and has a defined mat height and a defined mat density or defined weight per unit of surface area, is fed into the continuous press and pressed. To this end, there is the possibility that the particle mat in the intake mouth is precompressed in a precompression zone upstream of the intake plates down to an intake gap height $h_0$ and subsequently pressed widths the intake plates and finally of the heated plates. The intake gap height within the context of the invention means the height of the pressing gap, or the intake gap, widths the front edge of the upper and/or lower intake plates, or widths the axis or shaft of the upper and/or lower insertion wheel for the roller rods. Engineered wood panels within the context of the invention means in particular flakeboard panels (such as MDFs), particle panels, or also OSBs (oriented strand panel). The intake plates are preferably configured as heatable intake plates. Furthermore, they are preferably highly flexible intake plates, the upper intake plate and/or the lower intake plate being acted upon by a plurality of piston-cylinder assemblies for setting the intake shape.

Methods for producing engineered wood panels in continuous presses are known in a wide variety of embodiments. There is always the need to manufacture engineered wood panels in is flawless quality as economically as possible. For this reason, in a known method, or a known press of the type described above, the particle mat is already precompressed in a precompression zone upstream of the intake plates such that the heated intake plates are then available across their entire widths for building the temperature pressure in the particle mats, because excess air has already been driven out in the precompression zone. To this end, the precompression zone is formed by portions of the steel press belts that are supported on plain rollers, or belt supporting rollers, that are provided upstream of the intake plates and here can assume the function of press rollers (see DE 102 14 322 [US 20030213380). The measures known in this respect have generally been successfully applied.

In order to avoid damage to the press during operation, that the compression must be limited in the region of a potential precompression. For this reason, in practical experience care has been taken that the intake gap height does not drop below a defined minimum value, this minimum value being preselected based on the mat height of the fed chip mat (for example, 75% of the mat height).

Furthermore, a system for producing engineered wood panels is known where the upper heatable intake plate is divided into plate sections to form articulated joints such that the intake shape of the intake mouth in the articulated regions has bending points. A displacement-measuring system that measures the chip/fiber mat height by way of a displacement sensor and forwards it to a processor, is connected upstream of the intake system. The measured value is the controlled variable for the hydraulic actuators for the upper intake plate sections (see DE 43 01 594 [U.S. Pat. No. 5,404,810).

OBJECT OF THE INVENTION

The underlying object of the invention is to refine a generic method of pressing particle mats in a continuous press of the type mentioned above such that high compression can be employed right at the intake mouth, without fearing damage or malfunctions.

SUMMARY OF THE INVENTION

In order to attain this object, the invention teaches for a generic method of pressing particle mats for making engineered wood panels in a continuous press that the intake gap height be verified, set and/or controlled as a function of the density and/or the weight per unit of surface area of the particle mat. To this end, the invention is based on the realization that it is advantageous if the intake gap height, for example at the insertion shafts, is no longer set as a function of the mat height of the spread mat, but as a function of the density and/or the weight per unit of surface area of the mat. Consequently, a "density-dependent" mode of operation is proposed. The invention in a preferred and particularly simple embodiment thus proposes that the described verification, setting and/or regulation be carried out based on a predetermined target density and/or a predetermined target weight per unit of surface area. In the process, the invention is based on the realization that it is not absolutely necessary to carry out the described setting or regulation on the basis of the actually set and measured densities and/or weights per unit of surface area. In the course of deposition of the chip mat, the operators typically enter a target value for the weight per unit of surface area at a predetermined production-line speed, the actual weight per unit of surface area being used for controlling the deposition machine with or without feedback. The setting according to the invention of the desired setting height $h_0$ can then be carried out on the basis of this predetermined target value of the weight per unit of surface area of the chip mat, so that this target value, strictly as a standard value, is at least constant over a certain period. Target weight, or target weight per unit of surface area, within the context of the invention in particular means the so-called "pushed" target weight per unit of surface area, wherein the added term "pushed" clarifies that, for example, the belt weigher for the determination of the target weight per unit of surface area is provided upstream of the intake gap at a predetermined distance. When verifying or setting, therefore the time delay between the time of setting the target weight and the time at which the respective mat section enters the intake gap is taken into consideration. Per-forming the setting on the basis of the target value has the advantage that not every weight fluctuation requires a response.

The invention, in a modified embodiment, however also encompasses variants of the method in which the intake gap height is verified, set and/or controlled as a function of the set actual density, or the set actual weight per unit of surface area. For this purpose, the invention proposes that the density and/or the weight per unit of surface area of the mat are measured (directly) upstream of the intake mouth. The density and/or the weight per unit of surface area of the mat are preferably continuously measured (directly) upstream of the intake mouth, and the intake gap height is then controlled (continuously) as a function of these measured values. Directly upstream of the intake mouth within the context of the invention means a region upstream of the intake mouth, after which no further processing of the mat, and in particular no further compression, is carried out before this mat enters the intake mouth of the press.

Consequently, the invention proposes a “density-dependent mode of operation,” which is to say the intake gap height, or the permissible minimum value thereof, is no longer verified, and optionally set (exclusively) based on the mat height of the fed particle mat, but a setting is performed based on the target density, or actual density, of the fed particle mat, or the target or actual weight per unit of surface area thereof. To this end, the invention is initially based on the realization that the pressing operation can be controlled very effectively if strong compression is carried out already in the intake mouth, and optionally even in a precompression zone upstream of the intake plates. If, for example, chip mats having relatively low density are pressed, then—because the intake gap height is now set as a function of the density—as part of the invention relatively strong precompression can be carried out, which previously would have been inadvisable when solely evaluating the mat height. It is possible at all times to flawlessly adapt the intake gap height to the properties of the particle mat, the invention overall being based on the realization that a more precise adaptation of the intake gap height is possible when taking the density and/or the weight per unit of surface area into consideration. In contrast, if particle mats having relatively high density and a low mat height are to be pressed, which, for example, were pretreated in a powerful (separate) prepress, then as part of the invention there is the possibility that the intake gap height is selected such that further precompression in the precompression zone is completely foregone. The method according to the invention consequently works regardless of whether mats are used that are not prepressed or only slightly prepressed or strongly prepressed.

As part of the invention, first there is the possibility that “only” a verification is performed as to whether, based on the determined density and/or the determined weight per unit of surface area, the set intake height is permissible or not. To this end, a controllable culling device can be provided upstream of the continuous press in the manner known per se. According to the invention, this culling device is controlled as a function of the mat density and/or the weight per unit of surface area and/or the intake gap height. Such a culling device typically comprises a rejected material hopper provided underneath the mat conveyor and an adjustable belt section provided above such that the chip mat produced is dropped into the hopper when the hopper is “opened” and only fed to the press when the hopper is “closed”. Once deposition starts, there is the possibility as part of the invention to only close the culling device if the set intake gap height corresponds in the predetermined manner to the density and/or the weight per unit of surface area. According to a preferred refinement, not only a simple check is carried out, but a monitoring of the intake gap height, which is to say, the intake gap height is set based on the (determined) density and/or the (determined) weight per unit of surface area, optionally several times or quasi continuously, or at predetermined intervals, or continuously. Finally, there is also the possibility to carry out a “true” regulation of the intake gap height as a function of the mat density and/or the weight per unit of surface area. To this end, it is advantageous to determine the intake gap height using a suitable measuring device and supply it to the regulating process.

According to a further proposition of the invention, it is then provided that, for a target or actual weight per unit of surface area or a determined target or actual density, the intake gap height is set or controlled on condition that the nominal density $r_0$ of the mat widths the intake gap does not exceed a maximum predefined threshold value $r_{max}$.

The verification or setting or regulation can be carried out—as explained—based on the actually determined density. For this purpose, for example by means of a belt weigher, the weight per unit of surface area (in kg/m$^2$) can be determined, and the mat height can be determined using a height-measuring device, thereby allowing the density to be determined based on this data. According to a preferred embodiment, however, there is the possibility of foregoing a height measurement for this purpose, so that the intake gap height is then only set or controlled as a function of the target or actual weight per unit of surface area (in kg/m$^2$). To this end, the invention is based on the realization that across the intake gap a defined maximum density must not be exceeded. From the quotient of the weight per unit of surface area and the intake gap height, the generated density of the mat widths the intake gap can then be directly derived. In other words, the intake gap height is derived from the quotient of the (target) weight per unit of surface area and the maximum mat density $r_{max}$. In this way, a true density measurement of the mat upstream of the intake into the press can be foregone. During operation, at a defined target weight per unit of surface area, consequently the intake gap height is automatically set based on the maximum nominal density entered into a controller. If the target weight per unit of surface area is changed, the intake gap height is automatically adapted.

To this end, the invention proposes that for making OSBs the maximum permissible mat density widths the intake gap is 100 to 200 kg/m$^3$, preferably 150 to 200 kg/m$^3$, such as approximately 160 kg/m$^3$. Consequently, a desired value for the mat density widths the intake gap is specified and then the intake gap height is set, based on the respective weight per unit of surface area (such as the target weight per unit of surface area).

For making MDFs, the maximum mat density widths the intake gap is, for example, 100 to 200 kg/m$^3$, preferably 150 to 200 kg/m$^3$, such as 190 kg/m$^3$.

For making particle panels, the maximum mat density widths the intake gap is preferably 200 to 350 kg/m$^3$, such as 250 to 300 kg/m$^3$.

Additionally, there is the possibility as part of the invention to set and/or regulate the intake shape of the upper and/or lower intake plates as a function of the density of the mat and/or the weight per unit of surface area. This means that the prior density measurement can influence not only the setting of the intake gap height, but also the setting of the deformation of the intake plates. Furthermore, there is the possibility to set and/or regulate the intake gap height and/or the intake shape as a function of the density and the thickness of the finished pressed engineered wood panel.

An object of the invention is also an apparatus for pressing particle mats for making engineered wood panels in a continuous press according to a method of the type described above. This apparatus has a continuous press comprising a lower press part and an upper press part, steel press belts continuously circulating in the lower press part and upper press part, and an intake mouth, wherein the lower press part and in the upper press part each have a respective heatable press plate or heated plate and heatable intake plates projecting upstream at the intake connect to the heated plates form the intake mouth, and wherein the steel press belts are supported on the press plates and intake plates on an array of roller rods. In the intake mouth, a precompression zone may be provided upstream of the intake plates, wherein the mat optionally can be precompressed to the intake gap height in this zone. Furthermore, a device for setting the intake shape of the intake mouth and the intake gap height is provided. With respect to such a device, the invention proposes that at least one mat-measuring device for determining the density and/or the weight per unit of surface area of the chip mat is provided upstream of the continuous press. In addition, an intake gap-measuring device for determining the height of the intake gap may be provided. In order to determine the density, the mat-measuring device may comprise a weight per unit of surface area-measuring device (such as a belt weigher) on the one hand, and a height-measuring device (such as one or more laser measuring devices) on the other hand, wherein the density is determined from the weight per unit of surface area and height. If the mat-measuring device is only used to determine the weight per unit of surface area, a belt weigher without additional height-measuring devices is sufficient.

According to a particularly preferred embodiment, furthermore a controller is provided that is connected to the mat-measuring device and/or to the intake gap-measuring device and to the device for setting the intake gap height, and optionally to the device for setting the intake shape.

BRIEF DESCRIPTION OF THE DRAWING

The invention will be described in more detail below with reference to only one illustrated embodiment illustrated in the drawing. Therein.

DETAILED DESCRIPTION

Figure 1:
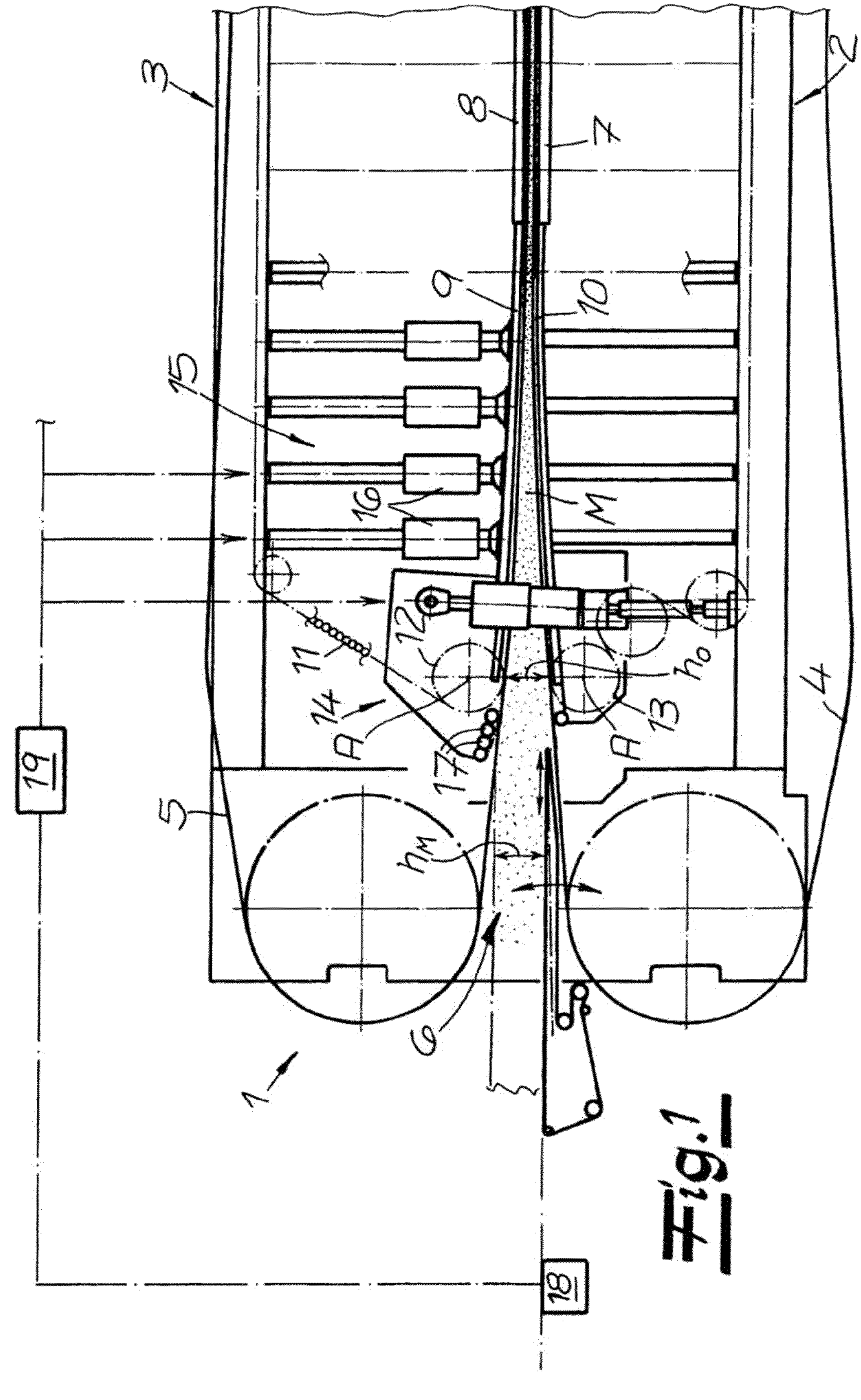
FIG. 1 shows an apparatus according to the invention for the production of engineered wood panels using a continuous press.

FIG. 1 shows a section of an apparatus for pressing particle mats into engineered wood panels. The core of such a system is a continuous press 1. It basically comprises a lower press part 2 and an upper press part 3, steel press belts 4 and 5 continuously circulating in the lower press part and upper press part, and an intake mouth 6, the lower press part 2 and the upper press part 3 having heatable press plates or heated plates 7 and 8, and heatable intake plates 9 and 10 projecting on the intake side connect to the heated plates 7 and 8 and forming the intake mouth 6. The steel press belts 4 and 5 are supported on the press plates 7 and 8 and intake plates 9 and 10 by arrays of roller rods 11. Widths the intake mouth 6, the roller rods 11 are guided over roller rod insertion wheels 12 and 13. Furthermore, a device 14 for setting the intake mouth and/or for setting the intake gap height $h_0$ is provided. In addition, a device 15 for setting the intake shape of the intake mouth 6 and/or for setting the intake shape of the intake plates 9 and 10 is provided. This device 15 for setting the intake shape comprises a plurality of piston-cylinder assemblies 16 connected to the intake plates in a predetermined array and preferably configured as double-acting differential piston-cylinder assemblies capable of exerting tension and pressure forces to the highly flexible intake plates 9 and 10.

The intake gap height $h_0$ within the context of the invention means either the intake gap height widths the front edge of the upper and/or lower intake plates 9 and 10 or (preferably) the intake gap height widths the axes A of the upper and/or lower insertion sprockets 12 and 13 for the roller rods 11. In practical experience, these two points are very close to each other.

The figures also show that a precompression zone V may be provided upstream of the intake plates 9 and 10 in the intake mouth 6 so the particle mat M can be precompressed in this zone from the starting mat height M to the dimension of the intake gap height $h_0$. In the embodiment, this precompression zone V is formed by portions of the steel press belts 4 and 5 that are supported on plain rollers, or belt supporting rollers 17 at the intake mouth 6. Typically one or more deposition stations for making the chip mat are part of a system for producing engineered wood panels. Such a chip mat can then be pretreated, for example, it can be precompressed in a prepress. These components are not shown in the figures.

Figure 2:
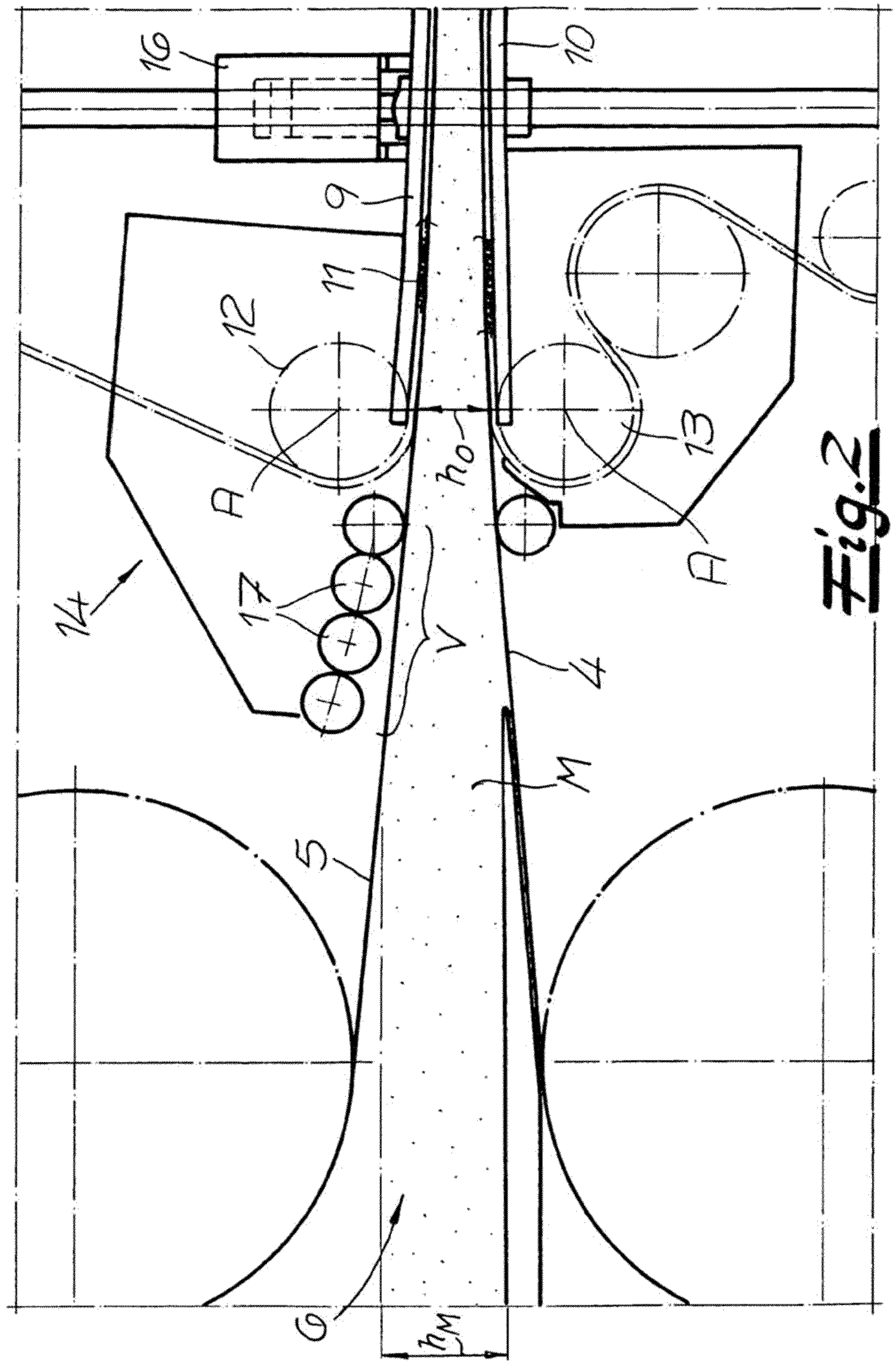
FIG. 2 is a section of the apparatus according to FIG. 1.

According to FIGS. 1 and 2, a mat-measuring device 18 for determining the weight $F_M$ per unit of surface area of the chip mat M is provided upstream of the continuous press 1. The weight per unit of surface area $F_M$ of the chip mat M here means the weight per unit of surface area of the chip mat immediately before entering the continuous press 1, which is to say the weight per unit of surface area of a chip mat that optionally has been prepressed in a prepress (not shown). In the embodiment, the measuring device 18 is configured as a belt weigher. Furthermore, in the figures a controller 19 operating with or without feedback is shown that is connected to the measuring devices 18 described and to the device 14 for setting the intake gap height $h_0$, and optionally to the device 15 for setting the intake shape of the intake mouth. This controller can be a processor.

In addition, the apparatus according to the invention typically comprises an unillustrated culling device that has a rejected material hopper or the like that is provided beneath the belt conveyor and can be opened for dropping in the mat and closed for conveying the mat in the direction of the press. Then, there is the possibility that this controllable culling device is likewise connected to the controller 19.

With the help of the belt weigher 18, for example with an initially open culling device, the weight per unit of surface area $F_M$ of the chip mat can be determined when the system is started. Now, there is the possibility, based on this determined weight per unit of surface area, to set the intake gap height $h_0$ such that the density $r_0$ of the mat widths the intake gap does not exceed a defined threshold value, such as 150 kg/m$^3$. In the spirit of a relatively simple verification, consequently it can be ensured that the culling device is only closed if the weight per unit of surface area $F_M$ and the intake gap height $h_0$ have a suitable ratio. As part of the invention, however, the intake gap height $h_0$ is preferably set continuously, or quasi-continuously, as a function of the determined density $r_M$ or the determined weight per unit of surface area $F_M$. To the extent that the intake gap height $h_0$ is actually measured, also a true regulating process can be carried out.

The intake gap heights are always set to be optimally adapted to the determined mat densities, so that the system can be operated under flawless conditions, without running the risk of damaging the system.

Figure 3:
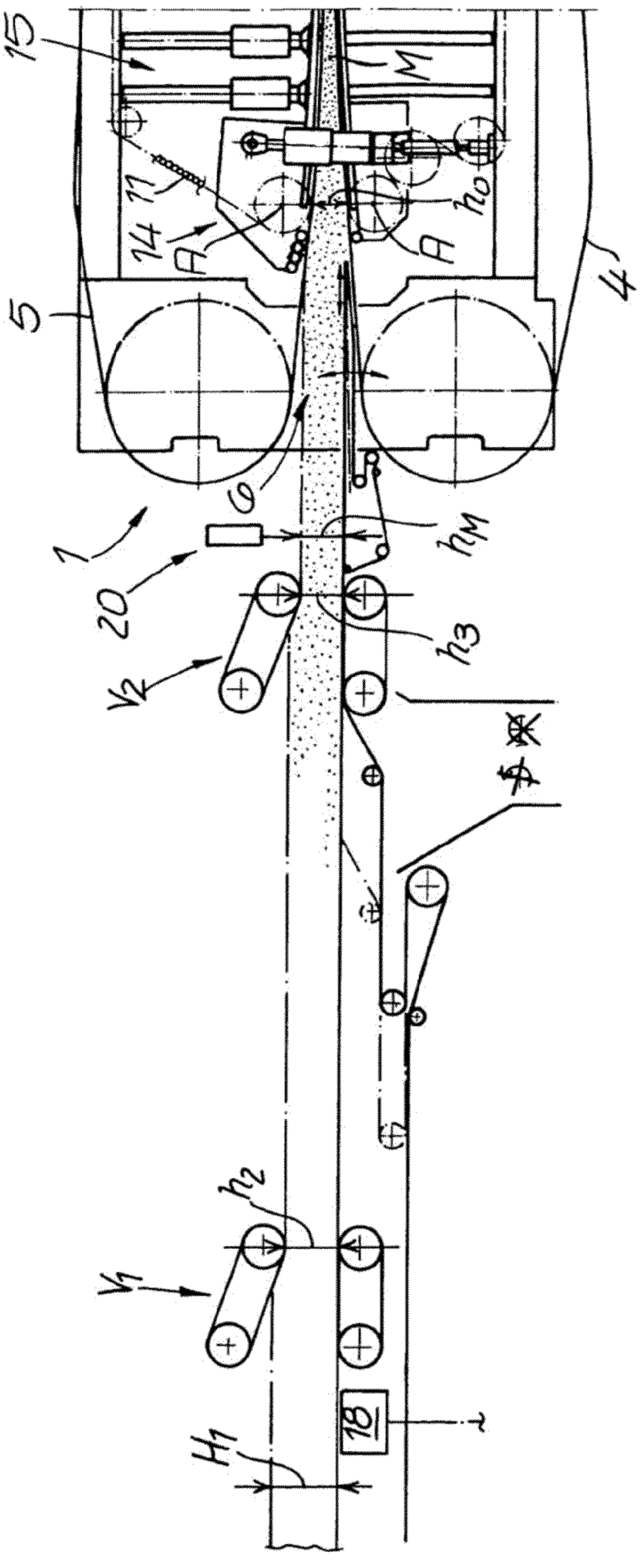
FIG. 3 shows a modified embodiment of the system of FIG. 1.

A modified embodiment of an apparatus according to the invention will be described based on FIG. 3. It shows a schematic illustration of a system for producing thin engineered wood panels, such as thin MDFs or thin particle panels. The deposition station is not shown. After the deposition station, a first height measurement $H_1$ and a measurement of the weight per unit of surface area using the belt weigher 18 can be carried out. This belt weigher 18 is not provided directly upstream of the press intake, but downstream of the deposition station. This belt weigher primarily serves to control the deposition station. A first prepress $V_1$ follows that compresses the mat to a height $h_2$. Thereafter, another precompression takes place widths the prepress $V_2$ to a mat height $h_3$. Directly upstream of the intake of the continuous press 1, the mat height $h_M$ can be determined with the help of a height-measuring device 20. The mat height $h_0$ widths the intake gap is likewise indicated. As already explained, as part of the invention, the intake gap height $h_0$ can be set based on the target value specification of the mat weight $F_{target}$ and based on a predetermined maximum value $r_{max}$ for the nominal density $r_0$ of the mat widths the intake gap. This maximum value is stored in the controller 19 as the value X, so that the intake gap height $h_0$ is set as a quotient of $F_{target}$ and X. The different system conditions can be taken into account by storing different values X. If a defined target weight per unit of surface area is then set, or the target weight per unit of surface area is changed during operation, the height $h_0$ is automatically adapted, thereby always ensuring flawless operation. The controller 19 is not illustrated in FIG. 3.

The invention claimed is:

1. A method of pressing particle mats for making engineered wood panels in a continuous press, the continuous press comprising upper and lower heated plates, upper and lower intake plates projecting on the intake side and designed to form an intake mouth with an intake gap, and respective steel press belts continuously circulating in the upper press part and lower press part, respective arrays of roller rods supporting the press belts on the respective intake plates and heated plates, the height of the intake gap being set, the method comprising the steps of:

feeding a particle mat produced in a deposition station upstream of the press and into the continuous press and pressing the particle mat in the press, verifying, setting, or controlling the intake gap height as a function of the weight per unit of surface area of the particle mat such that a particle mat having an actual density or weight per unit of surface area is produced based on a target density or weight per unit of surface area by verifying, setting or controlling the intake gap height as a function of the actual weight per unit of surface area and continuously or quasi continuously measuring the actual weight per unit of surface area upstream of the intake mouth and setting or controlling the intake gap height as a function of the measured weight.

2. The method according to claim 1, the particle mat being produced based on a predetermined target density or a predetermined target weight per unit of surface area wherein the intake gap height is verified, set or controlled as a function of the target density or the target weight per unit of surface area.

3. The method according to claim 1 wherein the intake gap height is the height of the pressing gap at the front edge of the upper and lower intake plates, or at the axis or shaft of the upper and lower insertion wheel for the roller rods.

4. The method according to claim 1 wherein the particle mat in the intake mouth is precompressed in a precompression zone upstream of the intake plates down to the intake gap height.

5. The method according to claim 1, a controllable culling device being provided upstream of the continuous press wherein this culling device is controlled as a function of the mat density or the weight per unit of surface area or the intake gap height.

6. The method according to claim 1 wherein the intake gap height for a weight per unit of surface area or a density is set on condition that the nominal density of the mat at the intake gap does not exceed a predetermined maximum value.

7. A method of pressing particle mats for making engineered wood panels in a continuous press, the continuous press comprising upper and lower heated plates, upper and lower intake plates projecting on the intake side and designed to form an intake mouth with an intake gap, and respective steel press belts continuously circulating in the upper press part and lower press part, respective arrays of roller rods supporting the press belts on the respective intake plates and heated plates, the height of the intake gap being set, the method comprising the steps of:

feeding a particle mat produced in a deposition station upstream of the press and into the continuous press and pressing the particle mat in the press, verifying, setting, or controlling the intake gap height as a function of the density or the weight per unit of surface area of the particle mat and thereby setting the intake gap height for a weight per unit of surface area or a density on condition that the nominal density widths the intake gap does not exceed a predetermined maximum value and that the intake gap height is derived from the quotient of the target weight per unit of surface area and the maximum permitted mat density at the intake gap.

8. The method according to claim 6 wherein the maximum permissible mat density at the intake gap during the production of OSBs is 100 to 200 kg/$m^3$.

9. The method according to claim 6 wherein the maximum permissible mat density at the intake gap during the production of MDFs is 100 to 200 kg/$m^3$.

10. The method according to claim 6 wherein the maximum permissible mat density at the intake gap during the production of particle panels is 200 to 350 kg/$m^3$.

11. The method according to claim 1 wherein the intake shape of the upper or lower intake plates is set or controlled as a function of the density or the weight per unit of surface area of the mat.

12. The method according to claim 1 wherein the intake gap height or the intake shape is set or controlled as a function of the plate density $r_p$ or the plate weight per unit of surface area $F_p$ or the height $h_p$ of the finished pressed engineered wood panel.

* * * * *